United States Patent
Whitlow

(10) Patent No.: US 10,871,583 B2
(45) Date of Patent: Dec. 22, 2020

(54) MERCURY-FREE CONCENTRATION STANDARD FOR X-RAY ANALYSIS

(71) Applicant: University of Louisiana at Lafayette, Lafayette, LA (US)

(72) Inventor: Harry James Whitlow, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 16/387,596

(22) Filed: Apr. 18, 2019

(65) Prior Publication Data

US 2019/0324164 A1 Oct. 24, 2019

Related U.S. Application Data

(60) Provisional application No. 62/661,873, filed on Apr. 24, 2018.

(51) Int. Cl.
*G01T 7/00* (2006.01)
*G01N 23/223* (2006.01)

(52) U.S. Cl.
CPC .......... *G01T 7/005* (2013.01); *G01N 23/223* (2013.01)

(58) Field of Classification Search
CPC .......................... G01N 23/223; G01N 23/207
See application file for complete search history.

(56) References Cited

U.S. PATENT DOCUMENTS

2013/0329272 A1* 12/2013 Matsumura .......... G01N 21/554
359/238

OTHER PUBLICATIONS

Romero et al. ("Silver nanoparticle-assisted preconcentration of selenium and mercury on quartz reflectors for total reflection X-ray fluorescence analysis", J. Anal. At. Spectrom., 2014, 29, 696-706) (Year: 2014).*

* cited by examiner

*Primary Examiner* — David P Porta
*Assistant Examiner* — Meenakshi S Sahu
(74) *Attorney, Agent, or Firm* — Richard L. Vail; Russel O. Primeaux; Kean Miller LLP

(57) ABSTRACT

Instruments used to analyze the chemical composition of samples must be calibrated to provide accurate results. Typically, standards are prepared that contain a known amount of the intended analyte to facilitate calibration of the analytical instrument. Various environmental issues are associated with use of mercury containing materials as standards for calibration of analytical instruments. Mercury and gold have very similar characteristic X-ray energies. Standards containing gold nanoparticles have been found to be a good surrogate for mercury in X-ray spectroscopy.

12 Claims, No Drawings

MERCURY-FREE CONCENTRATION STANDARD FOR X-RAY ANALYSIS

CROSS REFERENCE TO RELATED APPLICATION

This application claims priority to U.S. Provisional Application No. 62/661,873 "MERCURY-FREE CONCENTRATION STANDARD FOR X-RAY ANALYSIS" filed Apr. 24, 2018.

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

Not applicable

FIELD OF THE INVENTION

The present invention relates to the general field of chemistry, especially as it relates to analytical chemistry. The invention relates generally to a system and method of analyzing the concentration of mercury. In particular, the invention relates to use of surrogates, such as gold, as a standards for X-ray based analytical instruments for the analysis of the mercury concentration of samples.

BACKGROUND OF THE INVENTION

A need exists to produce reference standards for mercury to study the pathways of mercury in the environment, industrial production, restorative dental materials and quality control The significance is that the historical and current use of mercury and its detrimental health effects has left the USA and many other countries with a toxic legacy. One of the most common and also the one of the most debated is the use of mercury amalgam fillings, which in contrast to the case in many developed countries is still approved by the FDA may lead to bioaccumulation in the brain and kidneys. Another main source is chloro-alkali plants for production of chlorine and sodium hydroxide. Legacy sources include cosmetics, electronics, mercury arc rectifiers, thermometers, fluorescent lamps and batteries and until recently, munitions.

Mercury containing materials are then a matter of considerable interest in society. For determination of mercury content in products and solid materials where the concentrations are high; X-ray fluorescence methods are convenient and are faster, more portable and less time consuming than the atomic absorption spectroscopy and inductively coupled mass spectroscopy methods that are commonly used to analyze low mercury-levels in environmental samples.

Calibration of X-ray spectroscopic instruments requires use of mercury standards. The drawback of these is that these standards which contain mercury are inherently toxic and have to be securely handled, audited, stored and eventually disposed of These incur considerable costs. In addition mercury compounds are largely forbidden for transport by air, which will restrict the use of the mercury-based standards in the field.

DETAILED DESCRIPTION OF THE INVENTION

The invention includes the composition, and use thereof, of practical standards for analysis of mercury content in materials using X-ray fluorescence. Mercury, although an element with a wide range of applications is a potent toxin that bio-accumulates in the brain and kidneys.

The invention rests on three pillars. (i) Mercury (Hg) and gold (Au) have very similar characteristic X-ray energies. This means the absorption of their characteristic X-rays in different materials is generally closely similar. (ii) gold is readily and commercially available as nanometer sized particles. This characteristic allows extremely dilute alloys to be produced by powder metallurgy (iii) Gold does not oxidize readily allowing it to readily interdiffuse and reacts with many materials to form stable alloys.

In one embodiment of the invention gold nanoparticles are combined with a matrix metal powder (e.g. copper powder) by weighing followed by dispersion so agglomeration is negligible. In other embodiments, the matrix powder may be other metals or other substances as appropriate to calibrate a spectrometer for a particular alloy. An example would be dental amalgams. The required property of the matrix powder is that it forms a stable alloy, or compound with Au over the composition range of interest. The close similarity of the X-ray absorption coefficients for characteristic X-rays from gold or mercury allows standards that are very closely representative of the mercury-alloy to be produced. Examples of interest include gold-tin (Sn) to mimic mercury-tin, gold-silver (Ag) for mercury-silver alloys. This can in principle be extended to mimic ternary, quaternary and higher mercury-alloys. The only requirements being the constituents can be produced as a fine-powder and form a stable alloy with gold.

The gold-matrix combination is subsequently pressed to form a solid containing a defined fraction of gold. Heat may be applied to stimulate interdiffusion. The characteristic X-rays from gold are very similar to those from mercury as they have closely similar absorption in the matrix. These are precisely known for most elements and the correction factor can be absolutely calculated. The detectors have very closely similar detection efficiencies for gold and mercury characteristic X-rays and again a calculated correction factor can be applied. The use of nanogold is key as the areal aggregate concentration for the new standard and mercury standard must be identical over an area of a few cubic millimeters . Statistical variations will take place, especially at low concentrations of gold. The uncertainty will scale proportional to $N^{-1/2}$ where N is the number of particles seen by the analyzing beam. By using nanoparticles of gold the value of N required for a given concentration of gold is very much increased and hence the accuracy improved. The interdiffusion of gold in many materials to form solid solutions is beneficial as it means the standards will be more uniform.

I claim:

1. A standard without the toxicity of mercury used to calibrate an apparatus used to analyze a sample for mercury content which comprises:
   (a) gold nanoparticles;
   (b) a matrix powder.

2. The standard of claim 1 wherein the apparatus is a spectrophotometer.

3. The standard of claim 1 wherein the matrix powder is copper.

4. The standard of claim 1 wherein the matrix powder is tin.

5. The standard of claim 1 wherein the matrix powder is silver.

6. The standard of claim 1 where the elemental matrix powder forms a solid incorporating the gold nanoparticles on compression.

7. The standard of claim 1 where the matrix powder is comprised of more than one element.

8. The standard of claim 1 wherein the matrix powder is bound together by a precisely defined quantity of binder.

9. A method for determining the concentration of mercury in a sample comprising:
   (a) calibrating an X-ray spectrometer using a standard,
   (b) analyzing the sample using the calibrated X-ray spectrometer,
   (c) wherein the standard is comprised of gold nanoparticles and a matrix powder.

10. The method of claim 9 wherein the matrix powder is copper.

11. The method of claim 9 wherein the matrix powder is tin.

12. The method of claim 9 wherein the matrix powder is silver.

\* \* \* \* \*